United States Patent [19]

Bruckert

[11] Patent Number: 5,291,475
[45] Date of Patent: Mar. 1, 1994

[54] SLOT HOPPED FD/TD/CDMA

[75] Inventor: Eugene J. Bruckert, Arlington Heights, Ill.

[73] Assignee: Motorola, Inc., Schaumburg, Ill.

[21] Appl. No.: 859,175

[22] Filed: Mar. 27, 1992

[51] Int. Cl.$^5$ .............................................. H04J 3/16
[52] U.S. Cl. .................... 370/95.1; 370/95.3; 375/1
[58] Field of Search ............. 370/95.1, 95.2, 95.3, 370/52, 50; 375/1, 115; 415/52.1, 63

[56] References Cited

U.S. PATENT DOCUMENTS

| | | | |
|---|---|---|---|
| 4,677,617 | 6/1987 | O'Connor et al. | 370/50 |
| 4,747,101 | 5/1988 | Akaiwa et al. | 370/85.6 |
| 5,020,056 | 5/1991 | Chennakeshu | 370/95.1 |

Primary Examiner—Douglas W. Olms
Assistant Examiner—Ajit Patel
Attorney, Agent, or Firm—Raymond J. Warren

[57] ABSTRACT

In a wireless frequency and time division multiple access (FD/TDMA) communications system having time-slotted communications channels, there is provided a method of and apparatus for hopping wireless communications. It comprises sequencing slot assignments and sequencing frequency assignments, such that a multiplicity of frequencies are thereby usable at each site of a cellular FD/TDMA system without regard to local partitioning among surrounding uses thereof. The effect would be to probablistically reduce the interference, not only by the number of hopping frequencies, but by a factor of the number of time slots per frame.

6 Claims, 3 Drawing Sheets

FIG. 1

| Initial Slot | K | K+1 | K+2 | K+3 | K+4 | K+5 | K+6 | K+7 |
|---|---|---|---|---|---|---|---|---|
| 0 | 0 | 2 | 4 | 6 | 7 | 5 | 3 | 1 |
| 1 | 1 | 0 | 2 | 4 | 6 | 7 | 5 | 3 |
| 2 | 2 | 4 | 6 | 7 | 5 | 3 | 1 | 0 |
| 3 | 3 | 1 | 0 | 2 | 4 | 6 | 7 | 5 |
| 4 | 4 | 6 | 7 | 5 | 3 | 1 | 0 | 2 |
| 5 | 5 | 3 | 1 | 0 | 2 | 4 | 6 | 7 |
| 6 | 6 | 7 | 5 | 3 | 1 | 0 | 2 | 4 |
| 7 | 7 | 5 | 3 | 1 | 0 | 2 | 4 | 6 |

FIG. 3

| Initial Slot | K | K+1 | K+2 | K+3 | K+4 | K+5 | K+6 | K+7 | K+8 | K+9 | K+10 | K+11 | K+12 | K+13 | K+14 | K+15 |
|---|---|---|---|---|---|---|---|---|---|---|---|---|---|---|---|---|
| 0 | 0 | 0 | 2 | 2 | 4 | 4 | 6 | 6 | 7 | 7 | 5 | 5 | 3 | 3 | 1 | 1 |
| 1 | 1 | 1 | 0 | 0 | 2 | 2 | 4 | 4 | 6 | 6 | 7 | 7 | 5 | 5 | 3 | 3 |
| 2 | 2 | 2 | 4 | 4 | 6 | 6 | 7 | 7 | 5 | 5 | 3 | 3 | 1 | 1 | 0 | 0 |
| 3 | 3 | 3 | 1 | 1 | 0 | 0 | 2 | 2 | 4 | 4 | 6 | 6 | 7 | 7 | 5 | 5 |
| 4 | 4 | 4 | 6 | 6 | 7 | 7 | 5 | 5 | 3 | 3 | 1 | 1 | 0 | 0 | 2 | 2 |
| 5 | 5 | 5 | 3 | 3 | 1 | 1 | 0 | 0 | 2 | 2 | 4 | 4 | 6 | 6 | 7 | 7 |
| 6 | 6 | 6 | 7 | 7 | 5 | 5 | 3 | 3 | 1 | 1 | 0 | 0 | 2 | 2 | 4 | 4 |
| 7 | 7 | 7 | 5 | 5 | 3 | 3 | 1 | 1 | 0 | 0 | 2 | 2 | 4 | 4 | 6 | 6 |

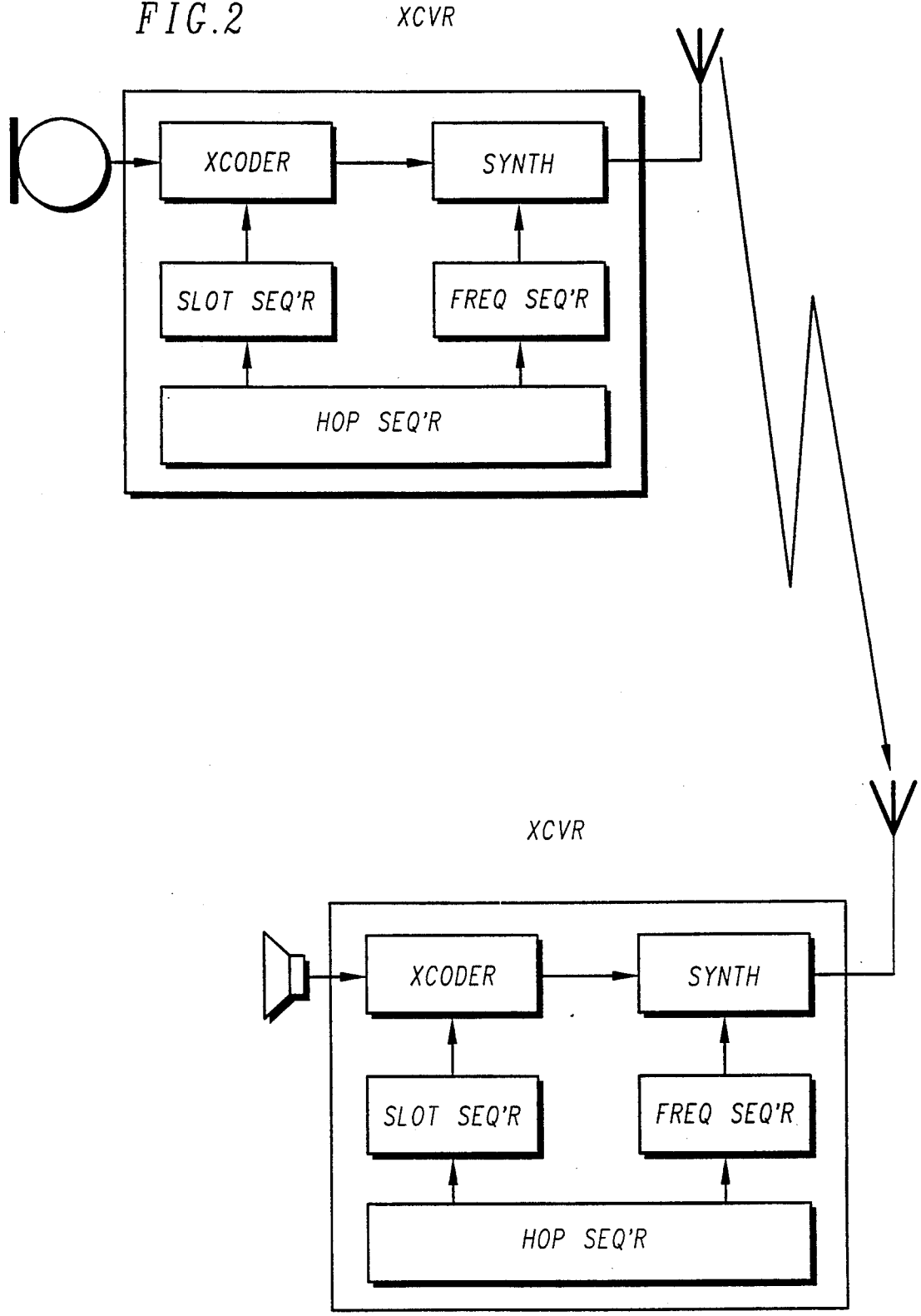

SLOT HOPPED FD/TD/CDMA

FIELD OF THE INVENTION

This invention is concerned with channel allocation for high capacity and spectral efficiency.

More particularly, in a cellular radiotelephone system, this invention is concerned with slow hopping in the time as well as frequency domain.

BACKGROUND OF THE INVENTION

Traditionally, the cellular radio spectrum was partitioned by frequency as a Frequency Division Multiple Access (FDMA) system. The set of available cellular carrier frequencies was distributed among the various sites that make up the repeating reuse pattern that is characteristic of the stereotypical cellular honeycomb pattern. The frequencies were distributed in such a way so as to minimize interference from adjacent channels, and from co-channel uses of the same frequency at the reuse distance. This process of minimizing adjacent and co-channel interference is called cellular frequency planning. A variety of techniques have been developed for avoiding this frequency planning and improving capacity and trunking efficiency by striving for a "one-site repeat"—namely, that all frequencies are capable of being used non-interferingly at each and every cell site. For them to be used non-interferingly, various techniques must be employed, involving intra-cell space/time/frequency coordination and probabilistic reduction of intercellular interference.

As higher capacities were demanded of cellular systems, each FDMA radio carrier was subdivided into Time Division Multiple Access (TDMA) "time slots" in a repeating frame of slots where several different subscribers use the same carrier frequency time-multiplexed to carry their compressed, digitized speech. Ordinarily, a subscriber is allocated a certain repetitive time slot on a single carrier frequency for the duration of his call.

Since these TDMA systems are so well organized in the time domain, they provided opportunities for coordination of the frequency and space domains such that "single site repetition" can be realized. Certain of these TDMA system designs contemplate frequency hopping, but for purposes of noise and interference reduction, not necessarily for achieving one-site repetition and avoidance of frequency planning. Rather than the subscriber being allocated a designated time slot per frame on a single carrier frequency, he is allocated a designated time slot and a frequency hopping sequence. The allocation of these sequences constitutes a "code", thus comprising a subset of the field of Code Division Multiple Access (CDMA) systems. To ease the burden on frequency synthesizers in subscriber equipment, these sequences typically "walk" the synthesizer sequentially through the available radio spectrum. All subscribers typically have a staggered start on this walk through the frequencies so as to be non-interfering or "orthogonal"—such that no two transmissions are on the same frequency at the same time in the same cell. If these hopping sequences are co-ordinated (spatially) with surrounding cells, the necessary coordination will have been realized in space, time, and frequency. Thus, all of the frequencies can theoretically be used in every cell, achieving a "single site repeat".

However, a problem arises from the phased introduction of these FD/TD/CDMA systems. Typically, there is initially very limited radio spectrum available for any new systems; and that meager spectrum that is allocated is typically apportioned among various competing operators in one locale. Thus, the opportunities for managing interference in either frequency, time, or space is severely limited.

This invention takes as its object to overcome these shortcomings and to realize certain advantages presented below.

SUMMARY OF THE INVENTION

In a wireless frequency and time division multiple access (FD/TDMA) communications system having time-slotted communications channels, there is provided a method of and apparatus for hopping wireless communications. It comprises sequencing slot assignments and sequencing frequency assignments, such that a multiplicity of frequencies are thereby usable at each site of a cellular FD/TDMA system without regard to local partitioning among surrounding uses thereof. The effect would be to probabilistically reduce the interference, not only by the number of hopping frequencies, but by a factor of the number of time slots per frame.

BRIEF DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the drawings in which:

FIG. 1 (FIG. 1) illustrates an exemplary slot-hop sequence in accordance with the invention.

FIG. 2 (FIG. 2) is a block diagram of the apparatus for executing both slot and frequency hopping in accordance with the invention.

FIG. 3 (FIG. 3) illustrates an exemplary slot-hop sequence for half- and full-rate coded speech in accordance with the invention.

DETAILED DESCRIPTION

Figure 4:
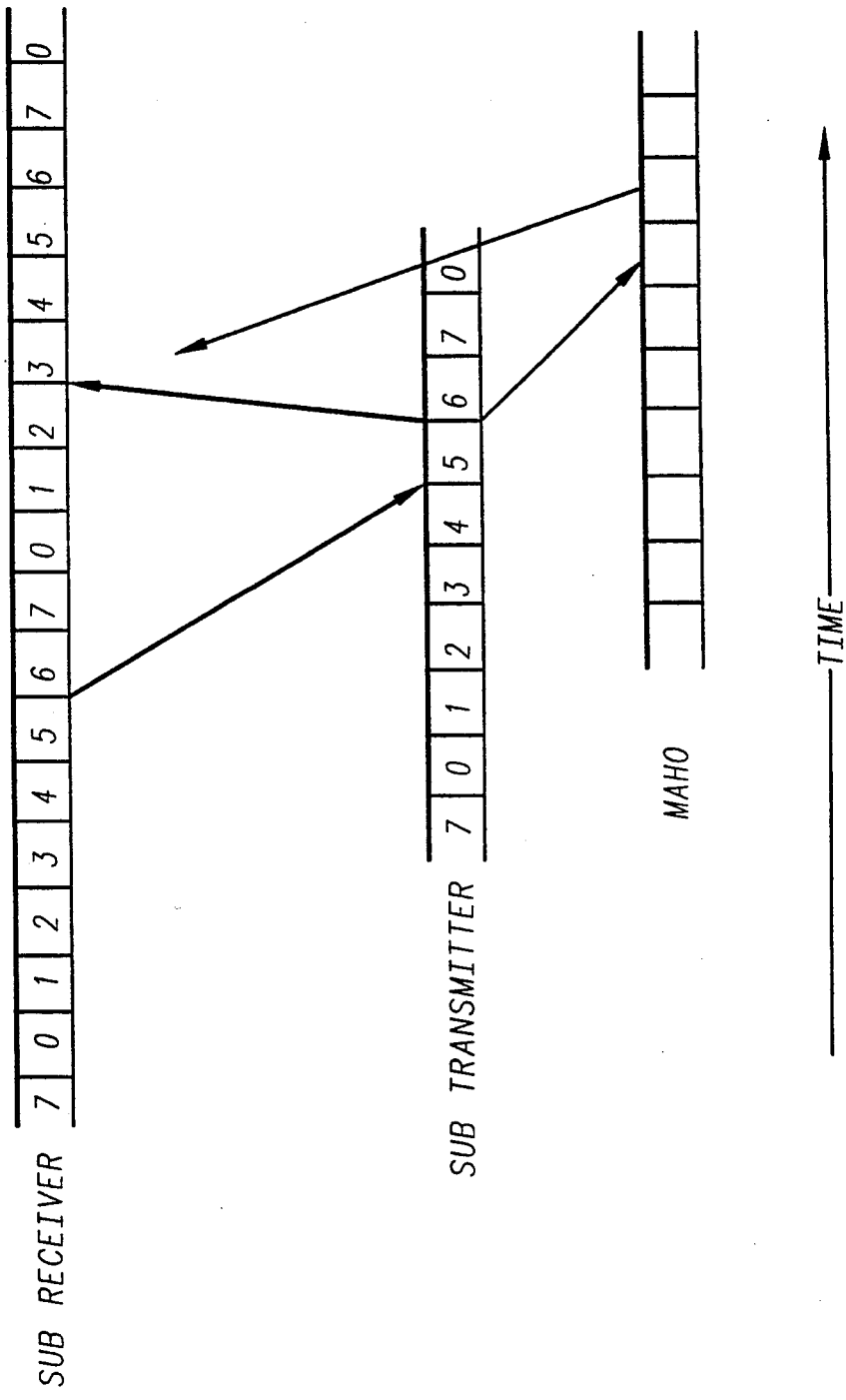
FIG. 4 (FIG. 4) illustrates the hopping of a subscriber in a simplex mode of operation and the monitoring problem mitigated by the sequences of FIG. 3.

This invention takes as its object to address this problem of hopping over limited spectrum (that ordinarily severely hampers the introduction of one-site reuse).

Where the number of frequencies over which to hop is limited and results in too great a likelihood of recurrent and excessive interference with adjacent cells, the interference can be probabalistically reduced by hopping over time slots as well as over frequencies. In other words, a subscriber would not be allocated the same time slot from frame to frame, but would change his slot assignment from frame to frame. The effect would be to probablistically reduce the interference, not only by the number of hopping frequencies, but by a factor of the number of time slots per frame. In the European GSM system, having eight slots per frame, the effect of slot-hopping would be to reduce the probabilities of interference from frequency-related collisions (and further probablistically reduce the interference) by a factor of eight. However, the problems associated with slot hopping are manifold:

In frequency-hopped (non-slot-hopped) TDMA systems, the radio's synthesizer has ample time, perhaps up to the duration of an entire frame, over which to hop to the next frequency. In slot-hopped systems, synthesizer demands are greater due to the (now) random time interval between hops.

Slot-hop sequences that would have the subscriber hop to the immediately adjacent time slots in the next frame must be removed from the slot assignment scheme while operating in a simplex mode.

Due to the delay due to the signal's propagation, the slot allocation scheme cannot hop a subscriber through to the next frame (thereby skipping a frame) or advance his slot assignment such that he is assigned two slots per frame (and thereby exceed the frame capacity).

Pre-existing non-slot-hopped schemes must be accommodated within the slot-hopping scheme.

To account for the variability (in time) of slot reception, nearly a full frame of delay may be necessary to allow for the worst case of these "accordion-" or "rubber-banding-" type effects.

The instant invention mitigates these adverse effects of slot-hopping while realizing the potential advantages of one-site repetition and the avoidance of frequency planning.

FIG. 1 (FIG. 1) illustrates an exemplary slot-hop sequence in accordance with the invention. It illustrates the same slot-hop scheme executed over successive frames simultaneously by all of the original occupants of each of the initial time slots.

FIG. 1 illustrates a slot-hopping scheme by which the slot assignment is cyclically walked to the end of the frame by twos and then by one, then walked backward by two slots and then by one back to the beginning of the frame. So, with respect to one subscriber that begins (K) at, say, slot 2, in successive frames (K+1, K+2, . . . ), he would walk forward by twos (2, 4, 6) and then by one (7) to the end of the frame and then backward by twos (7, 5, 3, 1) and then by one (0) back the beginning of the frame, and again forward by twos (2), ad infinitum.

In establishing the slot-hopping scheme, it is to be noted that the greatest amount of randomization (and therefore the probablistically least interference) is accomplished by making slot-hopping sequence length relatively prime with respect to the frequency hopping sequence length. In other words, if one was not a (relatively) prime number with respect to the other, the product of the two would have a common factor and the overall hopping sequence would, perhaps, be shorter than expected due to this commonality.

Moreover, particularly where adjacent sites are synchronous with the site of interest, all slot/frequency sequences ought to be staggered with respect to one another to probablistically reduce the likelihood of slot/frequency interference.

FIG. 2 (FIG. 2) is a block diagram of the apparatus for executing both slot and frequency hopping in accordance with the invention.

FIG. 2 illustrates a radio transceiver (XCVR) having a channel transcoder (XCODER) that accepts input from, say, a microphone (MIC). The transcoder prepares segments of digitized speech and organizes them in slot order for transmission. The transceiver contains a synthesized frequency modulator (SYNTH) that accepts the blocked and transcoded speech and modulates it for transmission over the RF carrier at the sequence of frequencies designated in the frequency-hopping sequence by the frequency sequencer (FREQ SEQ'R). The instant invention requires the introduction into this largely conventional transceiver architecture of a hopping sequencer (HOP SEQ'R) to coordinate the timing of a slot sequencer (SLOT SEQ'R) and the frequency sequencer (FREQ SEQ'R). The slot sequencer (SLOT SEQ'R), in turn, coordinates the transcoding (XCODER) into the particular sequence of slots required by a scheme like that of FIG. 1. The receive process at the other transceiver (XCVR) in the reconstruction and reproduction of the speech at the speaker (SPKR) on the other end of the RF link is an exactly reciprocal mirror image of the transmit process; all sequencers are primed with the very same frequency and slot sequencing information.

With the advance of speech coding technology, the TDMA systems to which this invention has been applied envision speech coders that are able to code the speech in half the number of bits. Thus, digitized speech need only be transmitted in every other frame. This "half-rate coded speech" can be accommodated (and intermixed with full-rate coded speech) with the scheme illustrated in FIG. 3. FIG. 3 (FIG. 3) illustrates an exemplary slot-hop sequence for both half- and full-rate coded speech in accordance with the invention. It illustrates a columnar doubling of the sequences of FIG. 1 to accommodate half-rate coded speech.

Frequency-hopped TDMA systems with subscriber(-Mobile-) Assisted HandOver (MAHO) and adjacent cell support regularly go through a cycle of: frequency hop, slot receive, slot transmit, slot monitor (for handover candidacy) and frequency hop again, ad infinitum. Using the instant invention, the cycle also incorporates slot hops (as prime with respect to frequency hops). Backward slot hops particularly frustrate the monitoring part of the cycle. As illustrated in FIG. 4 (FIG. 4), a subscriber (SUB) attempting to hop "backwardly" from slot 5 to slot 3 in the next frame would be unable to monitor MAHO channels for handover candidacy as there would be insufficient time to return to slot 3 (shown impossibly as negative time). However, the columnar doubling illustrated in FIG. 3 has the advantage of reclaiming some of that monitoring capability (at least with respect to full-rate subscribers) by (full-rate subscribers) remaining in the same time slot for two frames.

In a wireless frequency and time division multiple access (FD/TDMA) communications system having time-slotted communications channels, there has been provided a method of and apparatus for hopping wireless communications. It comprises sequencing slot assignments and sequencing frequency assignments, such that a multiplicity of frequencies are thereby usable at each site of a cellular FD/TDMA system without regard to local partitioning among surrounding uses thereof. The effect would be to probablistically reduce the interference, not only by the number of hopping frequencies, but by a factor of the number of time slots per frame. The attendant advantages of this invention have been presented throughout.

While the preferred embodiment of the invention has been described and shown, it will be appreciated by those skilled in this field that other variations and modifications of this invention may be implemented within the fundamental precepts presented. For example, a mechanism could be provided to otherwise randomize the slot/frequency hop rule established herein (as by table look-up, for example).

These and all other variations and adaptations are expected to fall within the ambit of the appended claims.

What I claim:

1. In a wireless frequency and time division multiple access, FD/TDMA, communications system for transmitting communication signals, said FD/TDMA system having communication channels defined by a plurality of slots within a frame, a hopped wireless communications device comprising, operatively coupled in series:

means for assigning, sequentially by frame, one of said communication signals to at least one slot at a time of said plurality of slots such that each of said plurality of slots is assigned to said communication signal according to a predetermined slot sequence;

and means for assigning, sequentially, said one of said communication signals to at least one frequency at a time of a plurality of frequencies such that each of said plurality of frequencies is assigned to said communication signal according to a predetermined frequency sequence, wherein said means for assigning said one of said communication signals to said slot is prime with respect to said means for assigning said one of said communication signals to said frequency.

2. The device as claimed in claim 1, wherein such primacy is established by a means for co-ordinating said means for assigning said one of said communication signals to said slot and said means for assigning said one of said communication signals to said frequency.

3. The device as claimed in claim 1, wherein said plurality of slots are cyclically allocated forwardly and backwardly across the slots within said frame by said means for assigning said one of said communication signals to said slot.

4. The device as claimed in claim 1, wherein a repetition of said slot assignment of said plurality of slots is related to a frame allocation rate.

5. A device as claimed in claim 1, wherein a repetition of said slot assignment of said plurality of slots is related to the frame allocation rate such that doubling the number of said slots operates with both a full-rate and a half-rate coded speech.

6. In a wireless frequency and time division multiple access (FD/TDMA) communications system having communication channels defined by a plurality of slots within a frame, a method of hopping wireless communication signals comprising:

assigning one of said communication signals, sequentially by frame, to at least one slot at a time of said plurality of slots such that each of said plurality of slots is assigned to said communication signal according to a predetermined slot sequence;

assigning said one of said communication signals, sequentially, to at least one frequency at a time of a plurality of frequencies such that each of said plurality of frequencies is assigned to said communication signal according to a predetermined frequency sequence; and using said plurality of frequencies at a first site and a second site adjacent to said first site in said cellular FD/TDMA system without regard to a local partitioning among surrounding uses thereof.

* * * * *

REEXAMINATION CERTIFICATE (2615th)
United States Patent [19]
Bruckert

[11] B1 5,291,475
[45] Certificate Issued Jun. 27, 1995

[54] SLOT HOPPED FD/TD/CMDA

[75] Inventor: Eugene J. Bruckert, Arlington Heights, Ill.

[73] Assignee: Motorola, Inc., Schaumburg, Ill.

Reexamination Request:
No. 90/003,516, Aug. 2, 1994

Reexamination Certificate for:
Patent No.: 5,291,475
Issued: Mar. 1, 1994
Appl. No.: 859,175
Filed: Mar. 27, 1992

[51] Int. Cl.$^6$ ............................................. H04J 3/16
[52] U.S. Cl. .............................. 370/95.1; 370/95.3; 375/203

[56] References Cited

U.S. PATENT DOCUMENTS

| | | | |
|---|---|---|---|
| 4,554,668 | 11/1985 | Deman et al. | 375/200 |
| 4,554,669 | 11/1985 | Deman et al. | 370/94.1 |
| 4,561,089 | 12/1985 | Rouse et al. | 370/18 |
| 5,276,907 | 1/1994 | Meidan | 455/33.3 |

FOREIGN PATENT DOCUMENTS

0189695 12/1985 European Pat. Off. .

*Primary Examiner*—Douglas W. Olms

[57] ABSTRACT

In a wireless frequency and time division multiple access (FD/TDMA) communications system having time-slotted communications channels, there is provided a method of and apparatus for hopping wireless communications. It comprises sequencing slot assignments and sequencing frequency assignments, such that a multiplicity of frequencies are thereby usable at each site of a cellular FD/TDMA system without regard to local partitioning among surrounding uses thereof. The effect would be to probablistically reduce the interference, not only by the number of hopping frequencies, but by a factor of the number of time slots per frame.

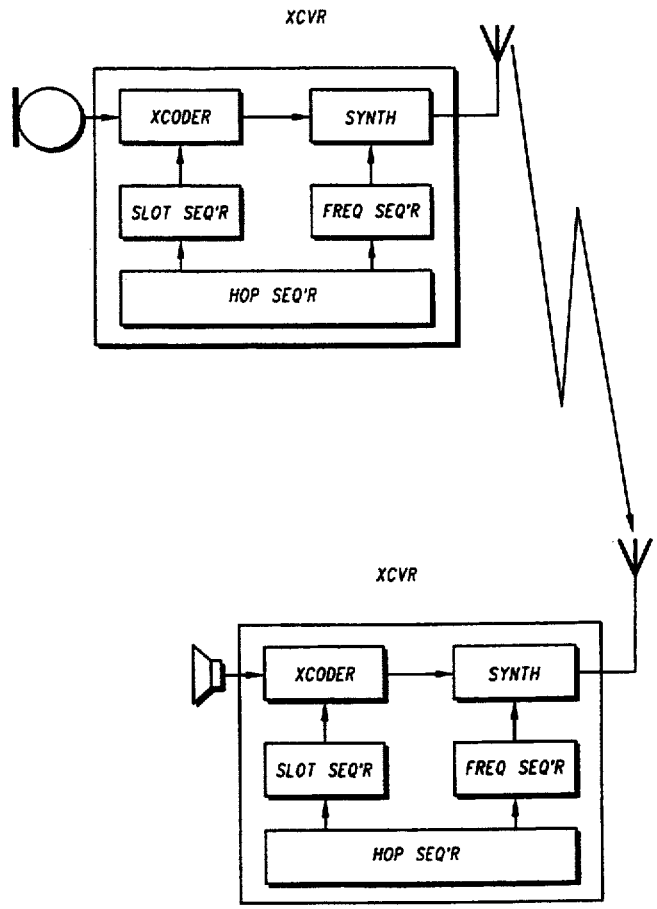

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 are confirmed.

Claim 6 is determined to be patentable as amended.

6. In a wireless frequency and time division multiple access (FD/TDMA) communications system having communication channels defined by a plurality of slots within a frame, a method of hopping wireless communication signals comprising:

assigning one of said communication signals, sequentially by frame, to at least one slot at a time of said plurality of slots such that each of said plurality of slots is assigned to said communication signal according to a predetermined slot sequence;

assigning said one of said communication signals, sequentially, to at least one frequency at a time of a plurality of frequencies such that each of said plurality of frequencies is assigned to said communication signal according to a predetermined frequency sequence *which is prime with respect to said predetermined slot sequence*; and using said plurality of frequencies at a first site and a second site adjacent to said first site in said cellular FD/TDMA system without regard to a local partitioning among surrounding uses thereof.

* * * * *